Sept. 7, 1943. L. A. WILKIE 2,328,869
SAW BAND AND METHOD OF LUBRICATING THE SAME
Filed July 5, 1941
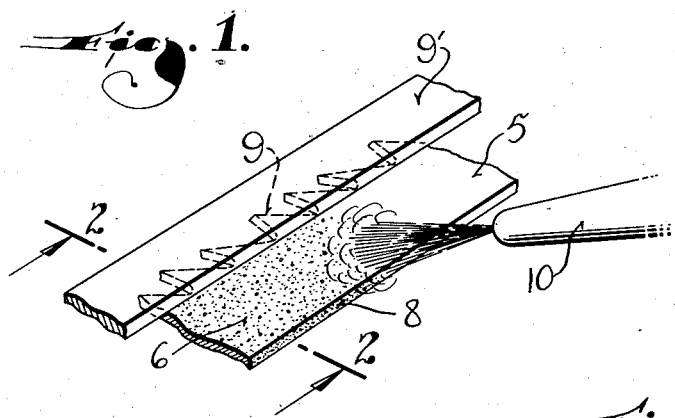
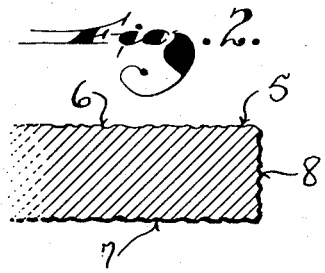
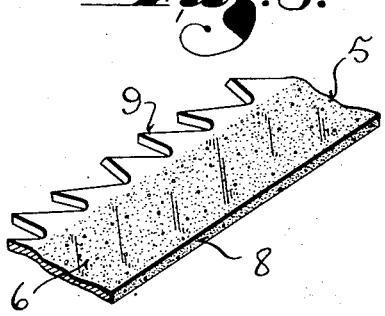
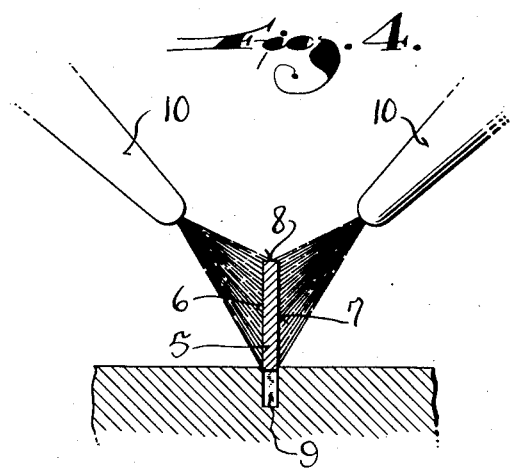
Inventor
Leighton A. Wilkie
By
Attorney Patented Sept. 7, 1943

2,328,869

UNITED STATES PATENT OFFICE 2,328,869

SAW BAND AND METHOD OF LUBRICATING THE SAME

Leighton A. Wilkie, Des Plaines, Ill., assignor to The Doall Co., Inc., Des Plaines, Ill., a corporation of Illinois Application July 5, 1941, Serial No. 401,106

2 Claims. (Cl. 117—49)

This invention relates to power sawing machines and has particular references to band saws.

As is well known, band saws are provided with spaced apart drive and driven pulleys about which an endless saw band or blade is trained, and usually have fixed guides adjacent to one straight stretch of the blade to receive the blade therebetween for preventing lateral displacement thereof during sawing operations.

For accurate metal sawing of the type called contour sawing, such guides are indispensable and must be adjusted to engage the opposite sides of the saw blade as well as the rear edge of the blade to prevent sidewise and edgewise displacement of the blade in the sawing zone. Thus, it is seen that while the guides are indispensable for accurate sawing, the saw blades are subject to much wear at their side and back surfaces due to the continual frictional engagement between such surfaces of the blade and the guides.

In many instances, especially when narrow saw blades are used for fine work, the surfaces of the blade contacted by the guides become worn to the point where the saw is rendered unfit for service while the teeth of the saw still retain considerable cutting life. The back edge of the saw is especially subject to wear inasmuch as it is pressed against the edge guide for the band with a considerable force during all sawing operations.

Ordinary methods of lubrication at the guides of the machine have been found totally inadequate to prevent excessive wearing of the sides and rear edge of the saw blade. This results from the fact that required close setting of the guides and the consequent metal to metal contact between the saw blade and the guides effectively forces the lubricant out of the contact zone between the blade and the guides.

This invention has as its main object to eliminate friction between the saw band and the guides as much as possible with a view toward increasing the life of the band.

More specifically, this invention has as its object the provision of a method for making band saw blades which have permanently lubricated surfaces to decrease friction and wear of the blade resulting from its passage through the guides therefor.

Another object of this invention resides in the provision of a method for impregnating the surfaces of a band saw blade contacted by guide means with lubricant to increase the life of the blade.

A further object of this invention is to provide a method for treating those surfaces of a saw blade engaged by guide means to render the same capable of permanently retaining a lubricant so that said lubricant will be at all times available at the areas of engagement between the blade and the guide means therefor.

With the above and other objects in view which will appear as the description proceeds, this invention resides in the novel product and process of producing it substantially as hereinafter described, and more particularly defined by the appended claims, it being understood that such changes in the precise embodiment of the hereindisclosed invention may be made as come within the scope of the claims.

The accompanying drawing illustrates two complete examples of the physical embodiment of the invention constructed in accordance with the best modes so far devised for the practical application of the principles thereof, and in which:

Figure 1 is a perspective view of a portion of a band saw balde illustrating the manner in which the surfaces of the blade contacted by guide means are treated for the retention of a lubricant thereon;

Figure 2 is an enlarged sectional view through a treated area of the blade taken on the plane of the line 2—2 in Figure 1;

Figure 3 is a perspective view similar to Figure 1 illustrating a section of band saw blade having its surfaces impregnated with lubricant after the treating process; and Figure 4 illustrates a slightly modified method of treating the surfaces of the blade to render the same capable of retaining a lubricant thereon.

Referring now particularly to the accompanying drawing, in which like numerals indicate like parts, the numeral 5 designates a portion of a band saw blade. As is customary, saw blades of this type are formed of flat flexible band material and have their ends welded together to form a continuous blade which is trained about the drive and driven pulleys (not shown) of the machine.

The opposite side faces 6 and 7 of the blade are received between suitable guides (not shown) and the back edge 8 of the blade is adapted to engage other guides during use of the blade so that its toothed edge 9 is presented to the work and held by the guides against lateral or edgewise displacement.

Inasmuch as it is absolutely necessary that the guides frictionally engage the side faces 6 and 7 as well as the back edge 8 of the blade for accurate sawing operations it follows that the blade is subject to considerable wear.

It frequently happens that the rear edge 8 of the blade wears faster than the toothed edge 9 thereof with the result that the saw band is rendered useless long before its teeth are worn out.

The method of making band saw blades contemplated by this invention and which has for its purpose to increase the life of the blade consists in two general steps. The first step consists in roughening or pitting the surfaces of the blade adapted to be contacted by guide means, and the second step consists in impregnating the roughened or pitted surfaces of the blade with a suitable lubricant so that the surfaces of the blade subject to wear through their engagement with the guide means are permanently lubricated.

The opposite sides 6 and 7 of the blade and the rear edge 8 thereof may be roughened or pitted in any suitable manner. One method which has been found practical for this purpose is illustrated in Figure 1 and resides in blasting the back edge and one side face of the blade with fine particle abrasive while the toothed portion of the blade is covered by a shield 9' to prevent damage thereto and the blade lies on its side on a substantially horizontal support. This may be accomplished by forcing special steel grit or other suitable fine particle abrasive through a nozzle 10 under high pressure so that the abrasive forcefully impinges the surfaces 6 and 8 of the blade. After one side and the back edge of the blade have been treated in this manner, the blade is turned to expose its other side for the blasting process.

If desired, the opposite side faces 6 and 7 of the blade as well as the back edge 8 thereof may be roughened simultaneously by the blasting operation as illustrated in Figure 4. As herein shown, the saw blade 5 has its toothed portion 9 received in a shallow channel formed in a horizontal supporting surface so that the blade stands on edge with its surfaces 6, 7 and 8 exposed. The abrasive may then be blasted from a pair of nozzles 10 at the opposite sides of the plane of the blade and slightly thereabove to roughen the exposed surfaces thereof simultaneously.

In any event, it is seen that the roughening operation consists essentially in increasng the surface irregularities of the blade to render the same capable of retaining a lubricating medium thereon.

After the surfaces 6, 7 and 8 of the blade have been thoroughly roughened or pitted in this fashion or by any other suitable treatment, lubricant is applied to the roughened surfaces to fill the myriad of tiny pits or depressions formed thereon. This lubricant is preferably a mixture of flake graphite and beeswax applied while hot and in a substantially liquid state to the roughened surfaces of the blade.

To insure thorough dispersion of the graphite in the body of the beeswax, it is necessary that the beeswax be heated at the time the graphite is added thereto. Thus, the substantially liquid beeswax with graphite in suspension therein when applied to the roughened or pitted surfaces of the blade firmly locks itself in the myriad of tiny pockets or pits formed in the blade with the result that the lubricant upon congealing under the influence of ordinary temperatures is in effect impregnated in the surfaces of the blade and is permanently retained thereby.

This coating of lubricant, therefore, at all times insures a film of lubricant between the sides and the back edge of the blade and the guide means therefor at the points of engagement therebetween. As the lubricant is retained permanently by these surfaces of the blade, it follows that the life of the blade is materially lengthened.

From the foregoing description it will be readily apparent that the method of this invention produces a saw blade for band saw machines having longer life than was heretofore possible and that the particular type of lubricating medium with which the surfaces of the blade contacted by guide means is impregnated does not render handling or packaging of the blades difficult as the lubricant is normally congealed and hence nontacky.

What I claim as my invention is:

1. The hereindescribed method of lubricating the normally smooth surfaces of a thin, flexible band saw blade which are normally engaged by guide means during use of the blade which comprises: blasting all the surfaces of the blade except the toothed portion thereof with a suitable fine grain abrasive to create a myriad of minute pockets distributed substantially uniformly throughout said surfaces; thoroughly mixing a finely divided solid lubricant with beeswax heated so as to be in a substantially liquid state; and applying said mixture of lubricant and beeswax while in said liquid state to said surfaces of the blade to fill the pockets formed therein so that upon cooling of the mixture to ordinary temperatures the beeswax congeals and locks the solid lubricant in said pockets.

2. As an article of manufacture: a thin flexible band saw blade having its normally smooth surfaces engaged by guide means during use of the blade uniformly pitted to provide closely spaced, shallow surface cavities therein; and a lubricating medium filling said surface cavities, said lubricating medium comprising beeswax containing a finely divided solid lubricant locked in place in the cavities by the beeswax.

LEIGHTON A. WILKIE.